United States Patent [19]

Hirano et al.

[11] Patent Number: 5,237,388
[45] Date of Patent: Aug. 17, 1993

[54] POLARIZED LIGHT MEASURING APPARATUS AND PHASE PLATE MEASURING APPARATUS

[75] Inventors: Isuke Hirano; Hironori Takahashi; Tsuneyuki Urakami; Tamiki Takemori; Yutaka Tsuchiya; Shinichiro Aoshima, all of Shizuoka, Japan

[73] Assignee: Hamamatsu Photonics K.K., Shizuoka, Japan

[21] Appl. No.: 762,457

[22] Filed: Sep. 19, 1991

[30] Foreign Application Priority Data

Sep. 20, 1990 [JP] Japan .................. 2-251317

[51] Int. Cl.⁵ .............................................. G01B 9/02
[52] U.S. Cl. ...................................... 356/351; 356/353
[58] Field of Search .................. 356/351, 364, 345, 353

[56] References Cited

U.S. PATENT DOCUMENTS 3,700,334 10/1972 Low et al. ..................... 356/351
4,310,247 1/1982 Korth et al. .

FOREIGN PATENT DOCUMENTS 1212946 11/1970 United Kingdom .

OTHER PUBLICATIONS

S. Nakadate, "High Precision Retardation Measurement Using Phase Detection of Young's Fringes," Applied Optics, vol. 29, No. 2, Jan. 10, 1990, pp. 242–246.

Primary Examiner—Samuel A. Turner
Attorney, Agent, or Firm—Finnegan, Henderson, Farabow, Garrett & Dunner

[57] ABSTRACT

Young's interferometer consisting of a single slit and a double slit member, and an analyzer are arranged along the axis of light to be measured. Parallel slits of the double slit member are provided with respective polarizers whose paralyzing directions are at ±45° to the longitudinal direction of the parallel slits. The polarizing direction of the analyzer is set in parallel with the parallel slits. The incident light passes through Young's interferometer and the analyzer to form an interference fringe, which is detected by an image detector unit. An image analyzer unit produces an intensity profile of the interference fringe and determines the polarization state of the incident light, for instance, by comparing the produced intensity profile with conceivable profiles stored in advance.

14 Claims, 11 Drawing Sheets

-45° COMPONENT    +45° COMPONENT

FIG. 18(A)   FIG. 18(B)   FIG. 18(C)
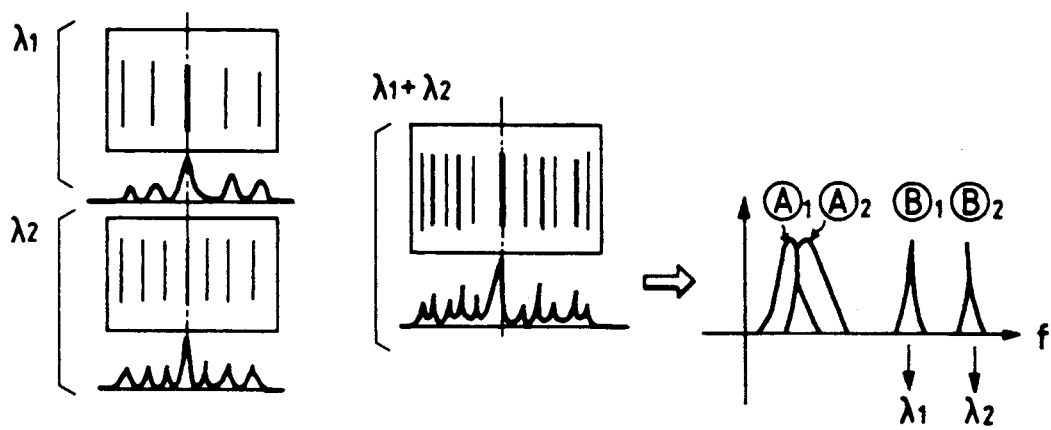
FIG. 19(A)   FIG. 19(B)
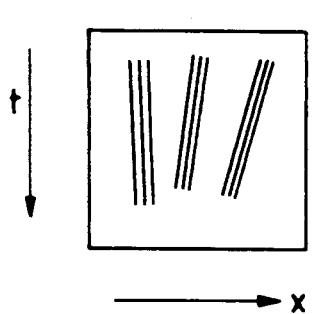 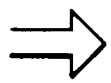 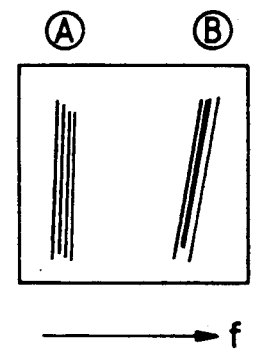

POLARIZED LIGHT MEASURING APPARATUS AND PHASE PLATE MEASURING APPARATUS

BACKGROUND OF THE INVENTION

The present invention relates to a polarized light measuring apparatus and a phase plate measuring apparatus, both using Young's interferometer.

There exist conventional polarized light measuring apparatuses in which the polarization state of light is detected by measuring intensity of the light after passing through a single rotatable polarizer.

In another type of apparatus using a high speed light detector such as a streak camera, a rotatable polarizer is also provided removably in front of the high speed light detector. In this type of apparatus, a temporal waveform of light is first measured without using the polarizer, and again measured with the polarizer attached, and the difference between the two waveforms provides information on the polarization state of the light under measurement.

However, those prior apparatuses are disadvantageous in that the polarizer must be movable and actually be moved, and that sufficient information cannot be obtained in the case of circular polarization light and elliptical polarization light. More specifically, the circular polarization cannot be discriminated from the random polarization, and no information can be obtained on the rotational direction of the circular polarization light.

Further, there is known a phase plate measuring apparatus according to Sénarmont's method. In this apparatus, incident light having horizontal linear polarization is passed through a sample, a quarter-wave plate and finally a polarizer, and output light is observed. Measurements are based on a rotation angle of the polarizer.

This type of apparatus also suffers from the problem of a necessity of moving the polarizer.

SUMMARY OF THE INVENTION

Accordingly, an object of the present invention is to provide a polarized light measuring apparatus which can provide sufficient information on the circular and elliptical polarization light without moving a polarizer.

Another object of the invention is to provide a phase plate measuring apparatus which can perform desired measurements without rotating a polarizer.

According to a first aspect of the invention, a polarized light measuring apparatus comprises:

Young's interferometer including a single slit, and a double slit member arranged in parallel with said single slit and having two parallel slits which are provided with respective polarizer elements having polarizing directions perpendicular to each other;

an analyzer provided downstream of said Young's interferometer;

image detecting means for detecting an interference fringe of incident light which has passed through said Young's interferometer and said analyzer; and image analyzing means for producing an intensity profile from an output signal of said image detecting means, and for analyzing said intensity profile to determine a polarization state of said incident light.

According to a second aspect of the invention, a phase plate measuring apparatus comprises:

light source means for emitting incident light having known polarization;

Young's interferometer including a single slit, and a double slit member arranged in parallel with said single slit and having two parallel slits which are provided with respective polarizer elements having polarizing directions perpendicular to each other;

a phase plate disposed between said light source means and said Young's interferometer;

means for rotating said phase plate about an axis of said incident light;

means for detecting a rotation angle of said phase plate;

image detecting means for detecting an interference fringe of said incident light which has passed through said phase plate, said Young's interferometer and said analyzer; and image analyzing means for producing an intensity profile from an output signal of said image detecting means, and for determining a phase difference and an axis of said phase plate on the basis of said detected rotation angle and a corresponding shift of a peak of said intensity profile.

With the above construction, the polarization state of incident light can be determined without any movable part. Circular polarization and random polarization can be discriminated from each other, and the rotational direction of circularly polarized light can be obtained.

In the case of using a high speed image detector unit such as a streak camera, a high speed variation of polarization state can be measured with high precision. At the same time, a variation of wavelength (chirp) can be measured.

Further, the axis and the retardation of a phase plate can be determined quickly without rotating a polarizer.

BRIEF DESCRIPTION OF THE DRAWINGS

FIGS. 18(A)-18(C) illustrate the operation of the apparatus of FIG. 15 in the case where incident light has multiple wavelengths;

FIGS. 19(A) and 19(B) illustrate the operation of the apparatus of FIG. 15 combined with a streak camera.

DESCRIPTION OF THE PREFERRED EMBODIMENTS

A first embodiment of the present invention will be described with reference to FIGS. 1-3.

Figure 1:
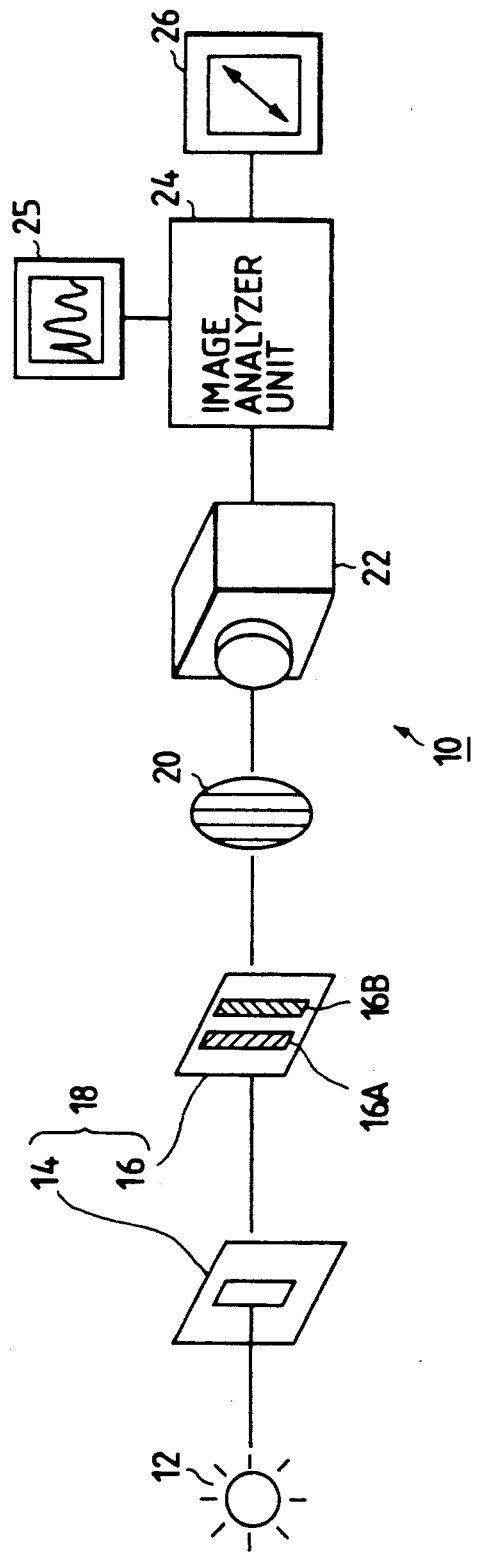
FIG. 1 is a partially perspective view showing a polarized light measuring apparatus according to a first embodiment of the present invention.

As shown in FIG. 1, in a polarized light measuring apparatus 10, Young's interferometer 18 including a single slit 14 and double slits 16 parallel to the single slit, an analyzer 20 and an image detector unit 22 are disposed, in this order, on the optical axis of light emitted from a light source 12 under measurement. The polarized light measuring apparatus 10 further includes an image analyzer unit 24 for analyzing a detected image on the basis of an output signal of the image detector unit 22, and a polarization state output unit 26 for displaying results of the analysis of the image analyzer unit 24.

A pair of polarizers 16A and 16B having polarizing directions of −45° and +45° with respect to the longitudinal direction of the double slits 16 of Young's interferometer 18, respectively, are placed in the double slits 16.

The analyzer 20 is arranged such that its polarizing direction becomes parallel to the longitudinal direction of each of the slits 14 and 16. Therefore, the polarizing direction of the analyzer 20 is deviated by +45° and −45° from those of the polarizers 16A and 16B, respectively.

The image detector unit 22 acts as a two-dimensional sensor, and detects interference fringes.

The image analyzer unit 24 produces an intensity distribution, i.e., "profile" of the interference fringe based on an output pattern in the form of alternate bright and dark bands of the image detector unit 22. The polarization state of the light emitted from the light source 12 is detected by analyzing the profile of the detected interference fringe.

The profile output unit 25 displays the profile thus obtained as an intermediate output of the image analyzer unit 24.

The polarization state output unit 26 outputs results of the analysis by the image analyzer unit 24.

The image analyzer unit 24 will be described in more detail. All the conceivable profiles of the interference fringes which would be obtained in response to various polarization states of incident light are stored in advance in the analyzer unit 24. The analyzer unit 24 sequentially compares, with the stored profiles, the profile which has been produced based on the interference fringe from the detector unit 22, and picks up one of the stored profiles which most closely resembles the produced profile to determine the polarization state. The result is provided to the polarization state output unit 26.

Figure 2:
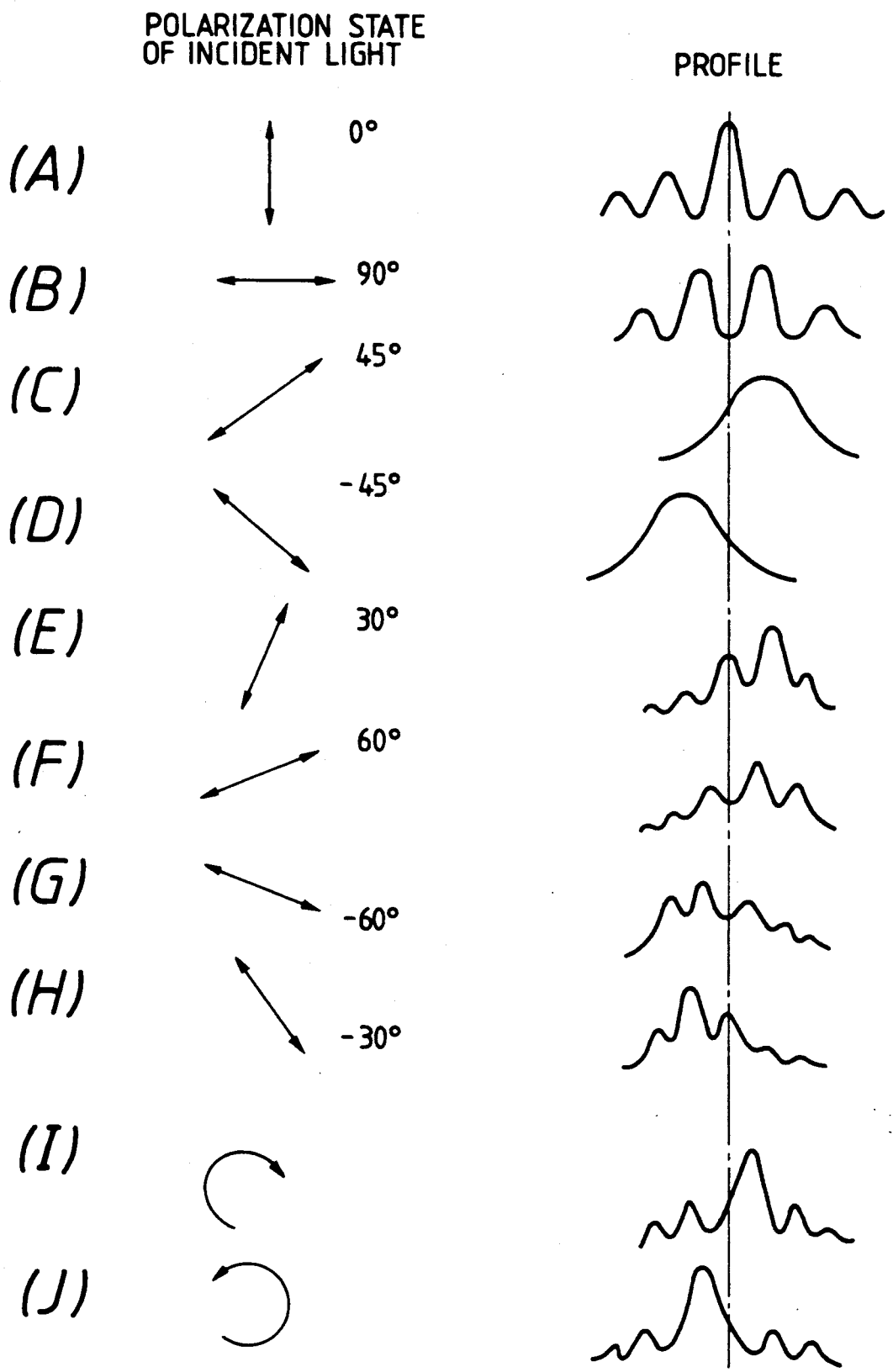
FIGS. 2(A)-2(J) shows the relationship between polarization states of incident light and corresponding profiles produced by an image analyzer unit in the case of linearly polarized light and circularly polarized light.
Figure 3:
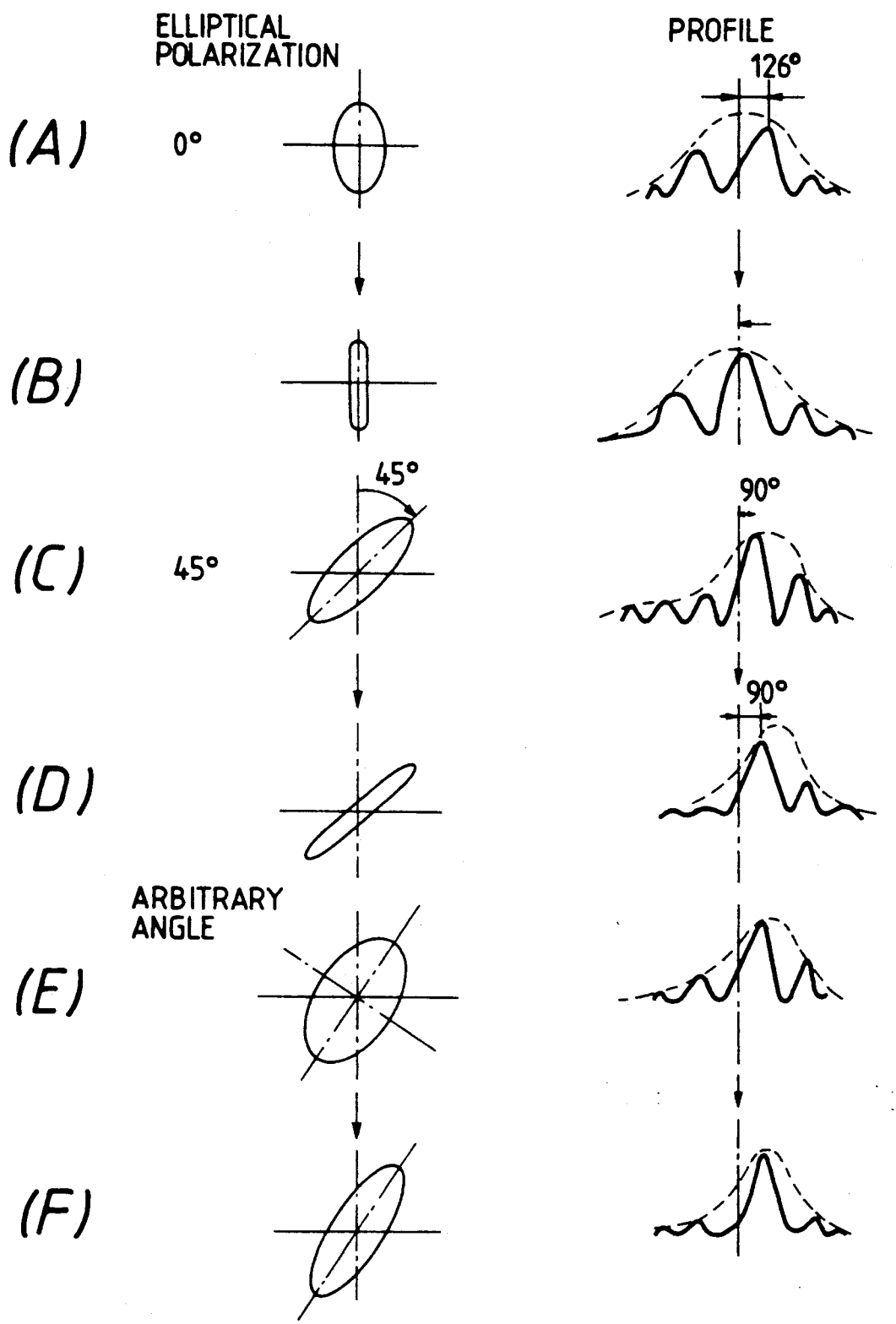
FIGS. 3(A)-3(F) shows the same relationship as FIG. 2 in the case of elliptically polarized light.

The relationships between the polarization states of incident light and the profiles produced by the image analyzer unit 24 are as shown in FIGS. 2 and 3. The profiles are shown in the right columns of these figures, in which the ordinate represents brightness (i.e., intensity), and the abscissa, a position.

Based on the analysis result of the analyzer unit 24, the polarization state output unit 26 displays, for instance, the fact of linear polarization and its angle as shown in parts (A)-(H) of FIG. 2, left column, or the fact of circular polarization and its rotational direction, i.e., dextrorotation or levorotation as shown in parts (I)-(J) of FIG. 2, left column.

In the case of the elliptical polarization as shown in FIG. 3, the profile obtained by the image analyzer unit 24 varies with the variations of the angle of the principal axis and the ellipticity. FIG. 3 illustrates only the dextrorotatory elliptical polarizations.

More specifically, in the case of an elliptical polarization having a major-to-minor-axis ratio of 2:1 and an angle of 0° as shown in part (A) of FIG. 3, left column, a profile as shown in part (A) of FIG. 3, right column will be obtained.

When such an elliptical polarization changes its ellipticity to assume a polarization as shown in part (B) of FIG. 3, left column, its profile takes a form as shown in part (B) of FIG. 3, right column; that is, the envelope of the profile remains unchanged and its phase is shifted.

An elliptical polarization of an angle 45° as shown in part (C) of FIG. 3, left column has a profile as shown in the corresponding part of the right column. When the ellipticity is changed to become a polarization as shown in part (D) of FIG. 4, left column, the envelope of the profile is changed while the phase remains unchanged.

Thus, it is understood that when the angle or ellipticity of an arbitrary elliptical polarization is changed, the phase and the envelope of a profile of a resulting elliptical polarization can be predicted. Therefore, the angle and ellipticity of a resulting elliptical polarization can be determined by analysis based on the phase and envelope of the original profile which are stored in advance in the image analyzer unit 24.

In other words, in the case of elliptical polarization, although it is ideally desirable for the image analyzer unit 24 to store all the conceivable profiles, it may store only standard profiles.

In the first embodiment, the light emitted from the light source 12 passes through the single slit 14, double slits 16 and analyzer 20, and forms an interference fringe on the image detector unit 22. The image analyzer unit 24 compares the profile of this interference fringe with the profiles stored therein, and picks up one of the stored profiles which most closely resembles the produced profile. The analyzer unit 24 determines the polarization state of the incident light on the basis of the profile thus picked up, and provides the polarization state output unit 26 with the results, that is, the fact of linear polarization and its angle, the fact of circular polarization and its rotational direction, or the fact of elliptical polarization and its angle and ellipticity. The polarization state output unit 26 displays such results of analysis.

In the first embodiment, all the conceivable profiles are stored in advance in the image analyzer unit 24, and the analyzer unit 24 selects one of the profiles which most closely resembles the profile of an interference fringe detected by the image detector unit 22, and determines the polarization state of incident light from the profile thus selected. This procedure may be called "complete matching system". The present invention is not limited to the complete matching system, but may be based on a "partial matching system".

According to the partial matching system, the kind of polarization state, i.e., linear, circular or elliptical polarization, is judged from the center state of the profile produced in the image analyzer unit 24.

As shown in FIGS. 2 and 3, in the case of linear polarization (except for the angles of ±45°), a peak or valley of a profile is located at its center, and in circular or elliptical polarization, a ridge line of a profile crosses its center line. Therefore, linear polarization may be distinguished from circular or elliptical polarization.

More specifically, the polarization direction of a linear polarization can be determined based on the difference between the intensities of a profile on the right and left sides of its center and whether a peak or valley is located at the center.

Where a linear polarization has a polarization direction of +45° or −45°, which coincides with the polarizing direction of the polarizer 16A or 16B, no interference fringe appears as shown in parts (C)–(D) of FIG. 2, right column. Therefore, these special cases can easily be discriminated.

The dextrorotatory and levorotatory circular polarizations can be discriminated from each other based on whether the left-side ridge line (part (I) of FIG. 2) or the right-side ridge line (part (J)) crosses the center line.

Figure 4:
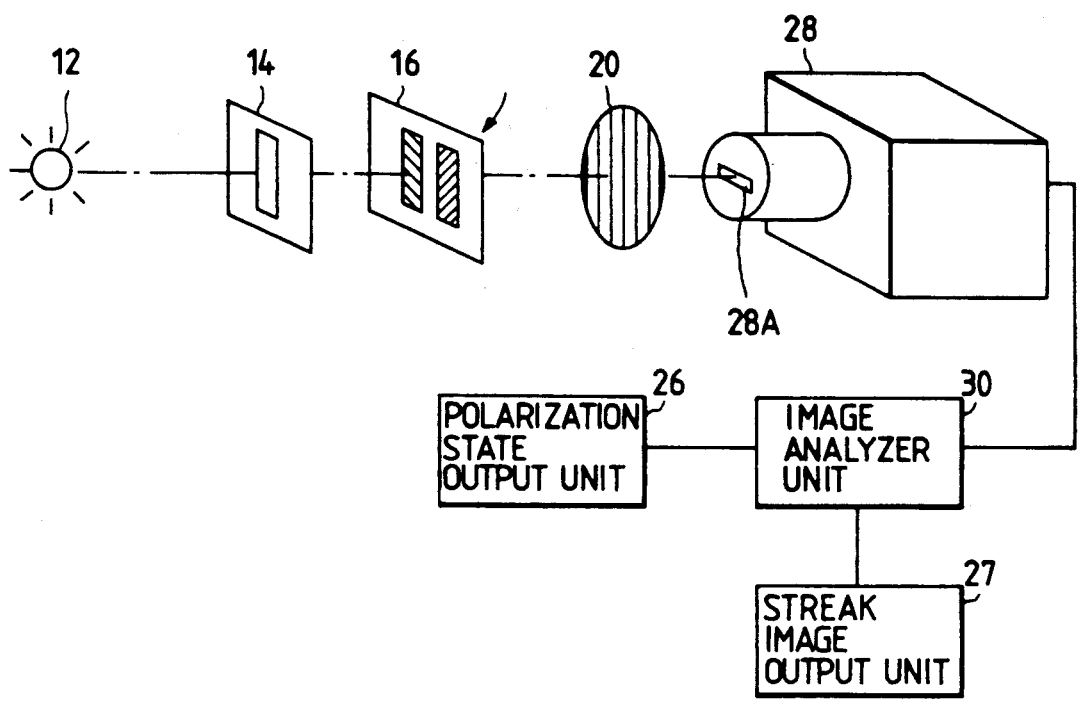
FIG. 4 is a partially perspective view showing a polarized light measuring apparatus according to a second embodiment of the invention.

A second embodiment of the invention shown in FIG. 4 will be described below.

The second embodiment employs a streak camera 28 as a high speed version of the image detector unit 22 of the first embodiment. The streak camera 28 and an incidence-side slit 28A disposed in front of the streak camera 28 make up a high speed line sensor.

An image analyzer unit 30 judges the polarization state of light emitted from a light source 12 under measurement on the basis of a streak image obtained by the streak camera 28. The streak image is displayed on a streak-image output unit 27.

The intervals of an interference fringe of a streak image indicate a wavelength of the incident light; the modulation degree, a wavelength spread; the phase and envelope, polarization states; and the width along the time axis, a pulse width of the incident light.

Figure 5:
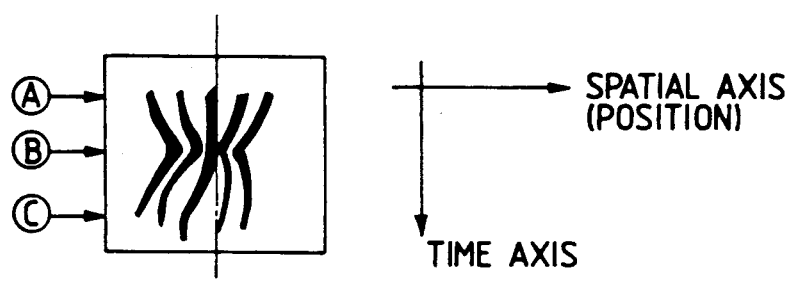
FIG. 5 shows an example of a streak image obtained by the apparatus of FIG. 4.

FIG. 5 shows an example of a streak image of an interference fringe. Since the intervals of an interference fringe depends on the wavelength of incident light, narrowing of intervals of the interference fringe from position A to position B in FIG. 5 indicates a wavelength shift to the shorter wavelength side.

The contrast of bright and dark bands becomes small from position A to position B in FIG. 5. This indicates that the wavelength spread has increased because the modulation degree of an interference fringe depends on the wavelength spread.

The phase of an interference fringe depends on the polarization states. The fact that the peak of the interference fringe lies at its center at position A in FIG. 5 indicates the vertical linear polarization. At position C in FIG. 5, the valley of the interference fringe lies at its center. This indicates the horizontal linear polarization.

Further, the pulse width of the incident light can be determined from the width of the streak image in the time axis direction.

In the second embodiment, the polarization states may be evaluated by sequentially analyzing the interference fringes of respective time points; in other words, there is no need of analyzing the whole streak image at one time. Specifically, a window having a sufficiently small time width on the time axis of the streak image is set in the direction of the incidence-side slit 28A. A profile of the streak image obtained is picked up by the image analyzer unit 30. The profile thus obtained is the same as the first embodiment. Therefore, if conceivable profiles are stored in the image analyzer unit 30, the polarization state of the light under measurement at that moment can be determined according to the complete matching system or partial matching system.

The apparatus of the second embodiment can concurrently perform not only the polarization state of light under measurement but also time-resolving measurements such as a high speed variation of polarization, a pulse width of light, a wavelength shift (chirp), a variation of a wavelength spread.

Although the analyzer 20 is fixed at 0° in the first and second embodiments described above, the invention is not limited to such a case but the analyzer 20 may be arranged in a rotatable manner.

It may be the case that, depending on the polarization state of the light under measurement, the difference between the intensities of the two light beams after passing through the polarizers 16A and 16B of the double slits 16 is too large to determine the polarization state.

Figure 6:
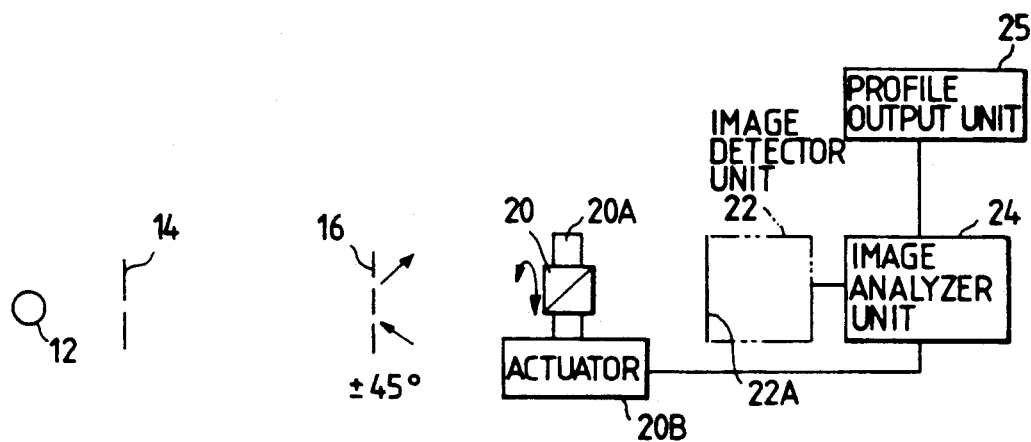
FIG. 6 is a block diagram showing a polarized light measuring apparatus according to a third embodiment of the invention.

To cope with this problem, an arrangement of a third embodiment as shown in FIG. 6 may be used. In this arrangement, the intensities of the light beams which emanate from the double slits 16 and travel toward the input plane of the image detector unit 22 can be controlled to be equal to each other by rotating the analyzer 20. This arrangement facilitates the measurement of interference fringes, and consequently provides easy and accurate analysis of polarization states.

In FIG. 6, reference numeral 20A designates a holder for the analyzer 20; 20B, an actuator for rotating the analyzer 20 together with the holder 20A; and 22A, an image input plane of the image detector unit 22.

Figure 7A:
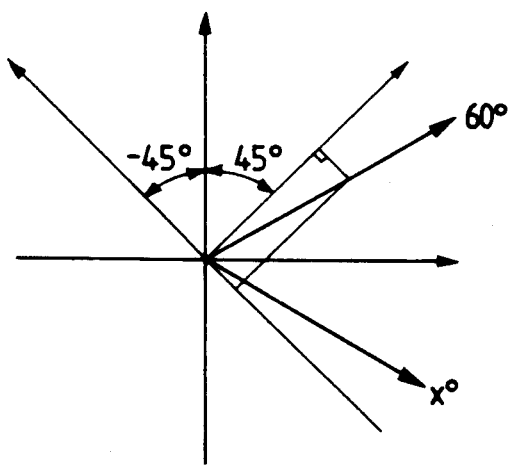
FIG. 7(A) is a vector diagram showing how various polarization components of incident light is extracted by polarizers and an analyzer.
Figure 7B:
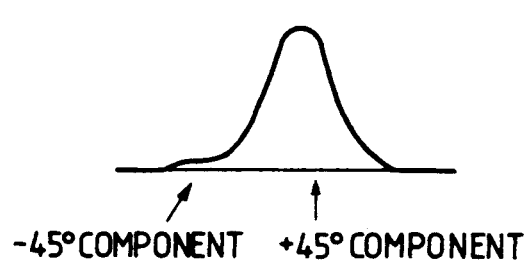
FIG. 7(B) shows an example of a detected profile of the incident light.

Assume here that, as shown in FIG. 7(A), the light under measurement is a linearly polarized light having a polarization direction at 60° from the vertical direction. In this case, intensities of the light beams extracted by the polarizers 16A and 16B of the double slits 16 are 0.933 for the direction of +45° and 0.067 for the direction of −45°. Since the difference between these two intensities is too large, it is difficult to obtain the ratio of the two intensities from the profile produced by the image analyzer unit 24 (see FIG. 7(B)). To obviate this problem, the analyzer 20 may be rotated by an appropriate amount about the optical axis to cancel out the above difference in light intensity.

More specifically, if a rotation angle with respect to the vertical direction is represented as X degree, the +45° component of the light incident on the image detector unit 22 is $0.933 \cos^2(X-45°)$ and the −45° component is $0.067 \sin^2(X-45°)$. The angle X to equalize the two components is 120°. Therefore, if the analyzer 20 is rotated about the optical axis by 120°, the envelope of the profile formed by the image analyzer unit 24 becomes symmetrical, facilitating the measurement.

In general, where polarized light beams having the amplitude A in the +45° direction and the amplitude B in the −45° direction are incident on the analyzer 20, the analyzer 20 may be rotated so as to satisfy the relationship: $A^2 \cos^2 (X-45°) = B^2 \sin^2 (X-45°)$. By this rotation, the profile produced by the image analyzer unit 24, which is due to the two light beams extracted by the polarizers 16A and 16B, can be made symmetrical. The above equation can be simplified as: $\tan(X-45°) = A/B$.

In an actual measurement, on the other hand, the analyzer 20 is rotated so that the average intensity of the envelope of the profile that is formed by the image analyzer unit 24 becomes symmetrical with respect to the vertical center line, and the rotation angle of the analyzer 20 is measured. The ratio of the components of the light beams extracted by the polarizers 16A and 16B is obtained on the basis of the measured rotation angle. To obtain this ratio, a signal representing an operation amount of the actuator 20B is provided to the image analyzer unit 24.

Although the above description was made for linearly polarized light, the measurement can also be facilitated for circularly or elliptically polarized light by rotating the polarizer 20 in the same manner.

Figure 8:
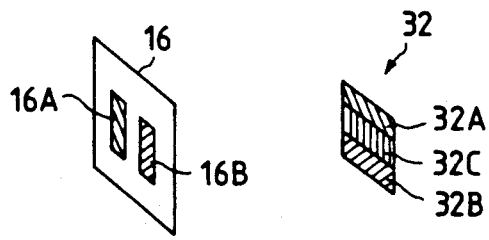
FIGS. 8, 9(A) and 9(B) show a polarized light measuring apparatus according to a fourth embodiment of the invention.

A polarized light measuring apparatus of FIGS. 8, 9(A) and 9(B) according to a fourth embodiment of the invention will be described below.

In the fourth embodiment, an analyzer 32 having first to third analyzer elements 32A-32C is disposed between the double slits 16 and the image detector unit 22 such that the analyzer elements 32A-32C are arranged in the longitudinal direction of the double slits 16. The polarizing directions of the first and second analyzer elements 32A and 32B coincide with those of the polarizers 16A and 16B of the double slits, respectively. The polarizing direction of the third analyzer element 32C disposed between the first and second analyzer elements 32A and 32B, coincides with the longitudinal direction (i.e., vertical direction in FIG. 8) of the double slits 16.

In this embodiment, the image detector unit 22 consists of three one-dimensional CCDs 34A-34C arranged in association with the respective analyzer elements 32A-32C.

Figure 9A:
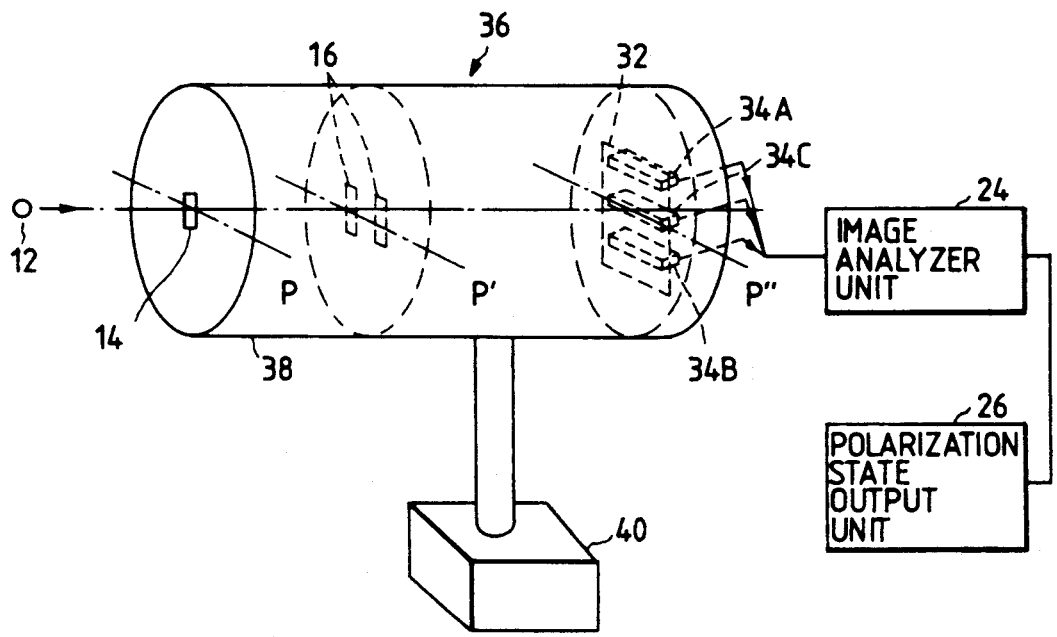
Figure 9B:
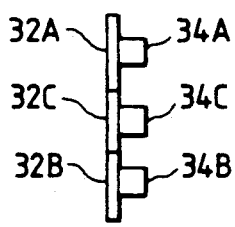

A specific construction of the fourth embodiment is shown in FIGS. 9(A) and 9(B). An optical measuring head 36 is made up of a single slit 14, double slits 16, the analyzer 32 and the one dimensional CCDs 34A-34C which are arranged such that their axis is the same as the optical axis of the light emitted from the light source 12 under measurement.

More specifically, the single slit 14, double slits 16, analyzer 32 and one-dimensional CCDs 34A-34C are arranged in this order within a lens-barrel 38 whose inside surface is painted black. The optical measuring head 36 is positioned using a magnetic stand 40 so that its axis becomes coincident with the axis of the light under measurement.

The positional relationship among the single slit 14, double slits 16 and analyzer 32 will be described below in detail. Let P represent a reference line which is drawn through the center of the single slit 14 and is perpendicular to the longitudinal direction of the single slit 14. Let P' represent another reference line which is drawn through the center of the double slits 16 and is perpendicular to the longitudinal direction of the double slits 16. The third analyzer element 32C is disposed on a line P" where the plane defined by the reference lines P and P' intersect the plane of the analyzer 32, in such a manner that its polarizing direction is perpendicular to the line P". The first and second analyzer elements 32A and 32B are disposed such that these sandwich the third analyzer element 32C in the direction perpendicular to the line P", and that they are equidistantly separated from the reference line P".

As shown in FIG. 9(B), the one-dimensional CCDs 34A to 34C are disposed in close contact with the rear faces of the first to third analyzer elements 32A-32C, respectively.

The operation of the apparatus of the fourth embodiment will be described hereinafter.

Figure 10A:
FIGS. 10(A)-10(C) are graphs showing profiles obtained through one-dimensional CCDs.
Figure 10B:
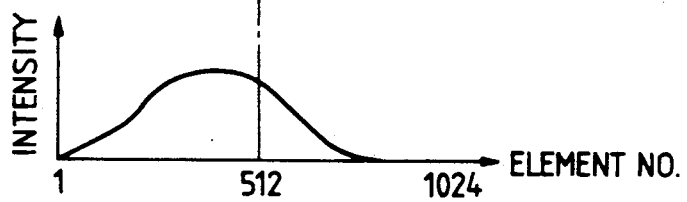

If it is assumed that each of the one-dimensional CCDs 34A-34C has 1024 pixels, profiles output from the CCDs 34A and 34B corresponding to the first and second analyzer elements 32A and 32B will be as shown in FIGS. 10(A) and 10(B), respectively. In each of FIGS. 10(A)-10(C), the center line is drawn to identify an output signal of the 512th element as the central element of each CCD.

Figure 10C:
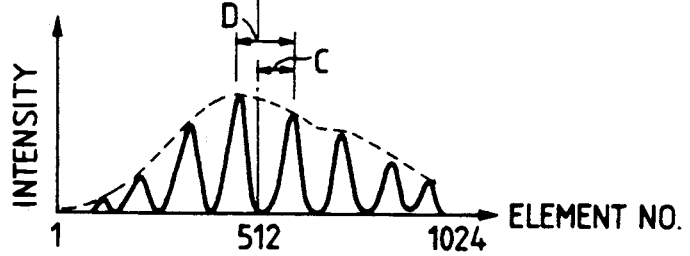

A profile obtained from the output of the third analyzer element 32C is as shown in FIG. 10(C), and has an envelope of an interference fringe, which depends on the profiles of FIGS. 10(A) and 10(B).

In the profile of FIG. 10(C), reference letter D indicates the difference between the element numbers of the two elements producing the peak values which are closest to the central element represented by the element number 512. Reference letter D indicates the difference between the element number of the element producing the peak value closest to and on the right side of the central element and the central element number 512. Integration values A and B of output signals $W_1$ and $W_2$ of the one-dimensional CCDs 34A and 34B shown in FIGS. 10(A) and 10(B) are respectively expressed as:

$$A = \sum_{N=1}^{1024} W_1(N), \text{ and } B = \sum_{N=1}^{1024} W_2(N).$$

A/B represents a ratio between intensities of the light components extracted by the polarizers 16A and 16B.

Further, $\theta (=360°\cdot C/D)$ is a phase advancement angle of the +45° polarization component with respect to the −45° polarization component.

Hence, arbitrary polarization state of light under measurement can be determined on the basis of the ratio A/B and the angle $\theta$.

The central wavelength of the light under measurement can be obtained from the value D.

The value D may be any of the difference between the element numbers of the elements corresponding to the two valleys located closest to the central element, an average of intervals between adjacent peaks over the entire profile, and an average of intervals between adjacent valleys over the entire profile.

Next, there will be explained how the polarization state is determined in a more precise manner in the fourth embodiment.

The profile of an interference fringe, when a light source of a single wavelength is used, is given by:

$$I(x) = I_1(x) + I_2(x) + 2\sqrt{I_1(x)I_2(x)}\ \cos(Kx + \theta) \qquad (1)$$

where x: position on the input surface, $I_1(X)$ and $I_2(X)$: profiles obtained when light beams passed through the respective slits of the double slits 16 are observed without subjected to interference, K: proportional constant depending on the layout of the optical system and the wavelength, and $\theta$: phase of an interference fringe.

In obtaining the phase $\theta$ of an interference fringe, it should be considered that since equation (1) contains the terms of $I_1(x)$ and $I_2(x)$, the method based on the peaks of a profile will possibly create an error in the phase value $\theta$ obtained where the profile $I_1(X)$ or $I_2(X)$ sharply varies. This problem can be solved in the following procedure. That is, the profiles $I_1(X)$ and $I_2(X)$ are obtained in advance, and then substituted into the following equation resulting from equation (1):

$$\cos(Kx + \theta) = [I(x) - \{I_1(x) + I_2(x)\}]/2\sqrt{I_1(x)I_2(x)}\ . \qquad (2)$$

The phase $\theta$ is precisely calculated from equation (2).

For example, in the case where one-dimensional CCDs are used for the image detector unit, if output signals from the elements of the element number N in the waveforms of FIGS. 10(A)–10(C) are written as $W_1(N)$, $W_2(N)$ and $W_3(N)$, respectively, a corrected output signal $W_3'(N)$ is expressed as:

$$W_3'(N) = [W_3(N) - \{W_1(N) + W_2(N)\}]/2\sqrt{W_1(N)W_2(N)}\ . \qquad (3)$$

By applying the method as illustrated in FIG. 10(C) to the corrected output $W_3'(N)$ of equation (3), the phase can precisely be calculated.

Although the above explanation was made for the light source of a single wavelength, the above procedure of calculating the phase of the profile of an interference fringe can likewise be applied to the case of a light source having a certain spectral spread, to calculate the phase in a precise manner. In this case, in addition that, as described above, the polarization state can be obtained on the basis of the ratio A/B and the phase $\theta$, the wavelength spread of the light under measurement can be determined from a profile spread at the peak of the corrected output signal $W_3'(N)$.

Figure 11A:
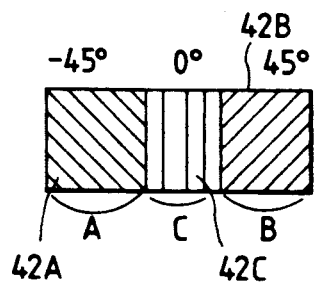
FIGS. 11(A)-11(C) illustrate an analyzer, a one-dimensional sensor, and an example of a detected profile, respectively according to a modification of the fourth embodiment.

In the fourth embodiment, the first to third analyzer elements 32A–32C of the analyzer 32 are vertically arranged. Alternatively, first to third analyzer elements 42A to 42C, which are similar to the analyzer elements 32A–32C, may be arranged horizontally, i.e., in the width direction of the double slits 16, as shown in FIG. 11(A).

Figure 11B:
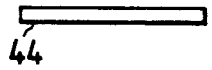

In this alternative, a single one-dimensional sensor 44 may be used for the image detector unit as shown in FIG. 11(B).

Figure 11C:
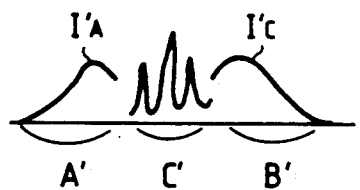

FIG. 11(C) shows an example of a profile obtained from light which is passed through the first to third analyzer elements 42A–42C and detected by the sensor 44. Part C' of the profile, which results from the interference, is obtained in association with the third analyzer element 42C. Only the intensity information is obtained in association with the first and second analyzer elements 42A and 42B, as shown in FIG. 11(C) as parts A' and B'.

Since the width of the third analyzer element 42C is limited, the number of bands in an interference fringe is small. But the small number causes no problem because it suffices that the phase difference of polarized light is determined from the position of the profile peak.

Since parts A' and B' which correspond to the first and second analyzer elements 42A and 42B have no bands, the ratio between the intensities of the light beams after passing through the two slits of the double slits 16 may readily be obtained.

In each of the above embodiments, the slit width and the distance between the slits of the double slits 16 are fixed, but the invention is not limited to this type.

Figure 12:
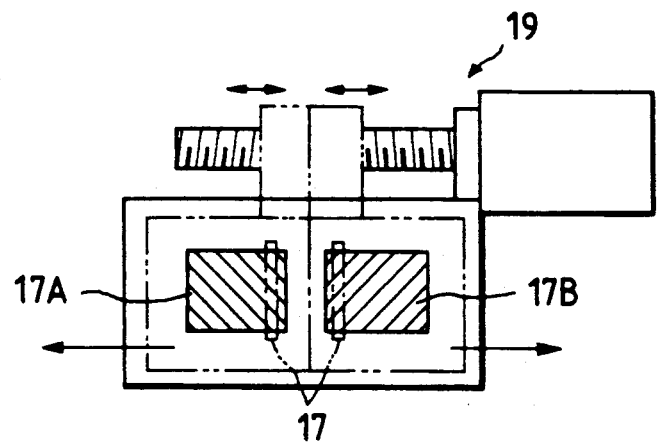
FIG. 12 shows double slits according to a fifth embodiment of the invention.

For example, as shown in FIG. 12, double slits 17 may be driven by an actuator 19 to vary the distance between the slits. In this fifth embodiment, polarizers 17A and 17B having the same polarizing directions as the polarizers 16A and 16B, respectively, are elongated in the movement direction over the movable range of the double slits 17.

According to this embodiment, an interference fringe suitable for the wavelength of the light under measurement can be obtained by selecting an appropriate distance between the slits of the double slits 17.

Figure 13:
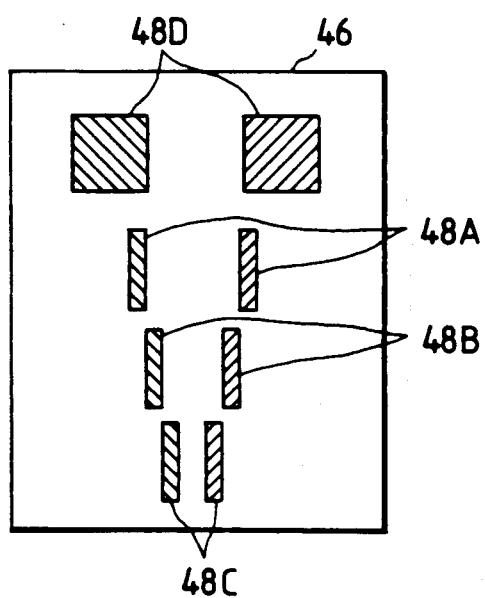
FIG. 13 shows a plurality of double slits according to a sixth embodiment of the invention.

Further, as shown in a sixth embodiment of FIG. 13, a plurality of double slits 48A–48C having different intervals may be arranged in a single plate 46, and incident light may be passed through the double slit 48A–48C simultaneously.

Additional double slits 48D may also be provided which have a slit width and interval that will cause no interference, and the incident light may also be passed through the double slits 48D simultaneously.

All of the above double slits are provided with polarizers having orthogonal polarizing directions, as in the first embodiment.

The operation of the sixth embodiment will be described below.

Where the light under measurement has a long wavelength, the number of bands in an interference fringe of a profile produced by the image analyzer unit 24 becomes small, which makes the image analysis difficult.

In the embodiments described above, the polarization state of incident light is determined by comparison of the phase and envelope of a profile that results from the passage through the polarizers 16A and 16B with those of the stored profiles. However, if a detected fringe is obscure, the envelope becomes unclear accordingly and the measurement accuracy will be degraded.

Figure 14:
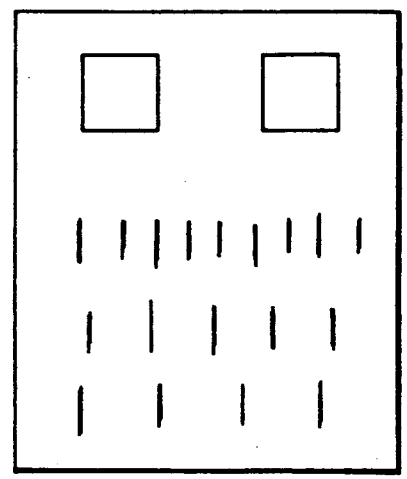
FIG. 14 shows images formed on an image detector unit in the apparatus of the sixth embodiment.

In the sixth embodiment of FIG. 13, a clear interference fringe, which means that the associated double slits are suitable for the wavelength of the incident light, may be selected among the interference fringes formed by the respective double slits 48A–48C (see FIG. 14), for subsequent image analysis and measurement. As a result, the phase of a profile can be determined with high precision.

Since the wide double slits 48D do not create an interference fringe (see FIG. 14), the incident light beams extracted by the polarizers 16A and 16B and passed through the analyzer 20 represent their own intensities. The ratio between intensities of the two light beams can easily be determined. Therefore, according to the sixth embodiment, the phase and intensity ratio of a profile can be obtained precisely, and a highly accurate measurement of the polarization state of the incident light can be performed.

The sixth embodiment requires a two-dimensional sensor as the image detector unit, since the images of the incident light beams passing through the double slits 48A–48D in the plate 46 should be detected simultaneously.

Figure 15:
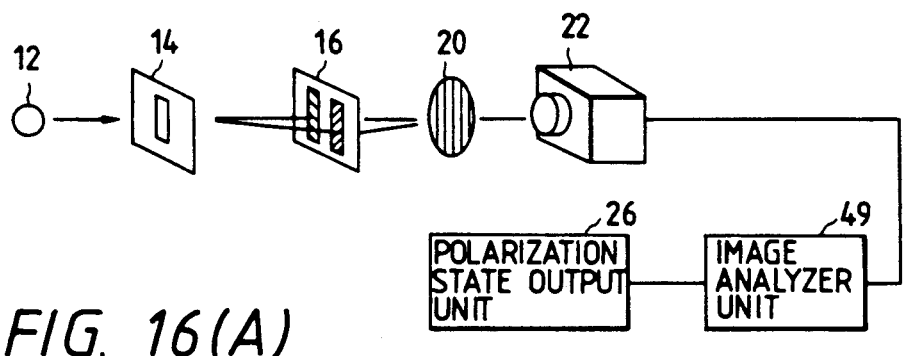
FIG. 15 is a partially perspective view showing a polarized light measuring apparatus according to a seventh embodiment of the invention.

In the embodiments described above, the polarization state of light under measurement is determined by, for instance, the pattern matching which is performed in the analyzer unit 24 or 30 such that the profile produced from the output of the image detector unit 22 or streak camera 28 is compared with the stored profiles. FIG. 15 shows a seventh embodiment of the invention, in which the polarization state of incident light is determined in an image analyzer unit 49 by a Fourier transform method.

As described above, the polarization state of light under measurement can be determined if the intensity ratio A/B of and the phase difference $\theta$ between the light beams passing through the polarizers 16A and 16B of the double slits 16 and the analyzer 20 or 32 are known. In the seventh embodiment, Fourier transform is applied to the profile to produce a frequency-axis profile. In such a frequency-axis profile, an interference fringe component (high frequency component) containing information on the phase difference $\theta$ and the other component (low frequency component) containing information on the intensity ratio A/B are separated from each other.

Figure 16A:
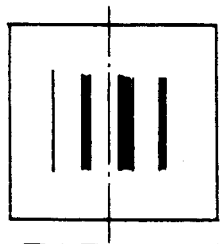
FIGS. 16(A)-16(D) and 17(A)-17(B) illustrate the operation of the apparatus of FIG. 15.
Figure 16B:
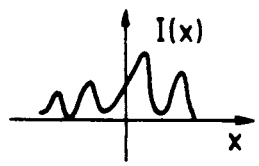

FIG. 16(A) shows an example of an output pattern from the image detector unit 22. Its profile I(x) is as shown in FIG. 16(B). I(x) is expressed by equation (1) already discussed above:

$$I(x) = I_1(x) + I_2(x) + 2\sqrt{I_1(x)I_2(x)} \cos(Kx + \theta) \quad (1)$$

Since terms $I_1(X)$ and $I_2(X)$ vary slowly compared with the component representing the interference, equation (1) can be separated into a low frequency component $I_A(X)$ and a high frequency component $I_B(X)$. That is, $$I(X) = I_A(X) + I_B(X) \quad (4)$$
where
$$I_A(X) = I_1(x) + I_2(x), \quad (5)$$
and
$$I_B(X) = 2\sqrt{I_1(x)I_2(x)} \cos(Kx + \theta). \quad (6)$$

Figure 16C:
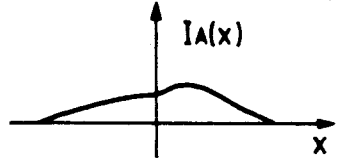
Figure 16D:
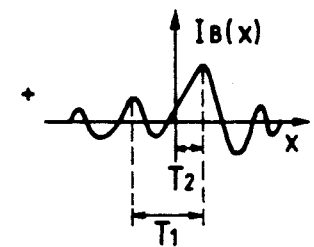

$I_A(X)$ and $I_B(X)$ are shown in FIGS. 16(C) and 16(D), respectively.

Figure 17A:
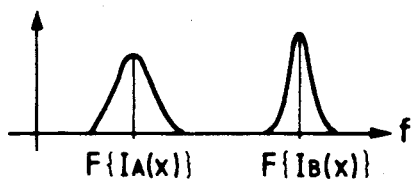

$F\{I_A(X)\}$ and $F\{I_B(X)\}$ can be obtained by Fourier-transforming the profile I(x) of FIG. 16(B). In these expressions, "F" is a Fourier transform operator. As shown in FIG. 17(A), $F\{I_A(X)\}$ and $F\{I_B(X)\}$ can be separated on the frequency axis.

Only $I_A(X)$ of FIG. 16(C) can be obtained by removing $F\{I_B(X)\}$ in FIG. 17(A) using a low-pass filter, and then inverse-Fourier-transforming the filtered result.

Figure 17B:
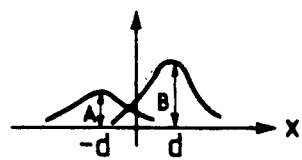

$I_A(X)$ is a superposition of the profiles of the light under measurement, which are obtained by opening the slits of the double slits 16 at different time points. These profiles are as shown in FIG. 17(B), and expresses as:

$$I_1(X) = A[\sin\{K'(x+d)\}/K'(x+d)]^2$$

$$I_2(X) = B[\sin\{K'(x-d)\}/K'(x-d)]^2.$$

By the least squares method, A and B can be calculated from the above two equations and the data of $I_A(x)$ of FIG. 16(C).

In the above expressions, A and B represent the intensity amplitudes of $I_A(X)$ and $I_B(X)$, respectively; 2d, the distance between the slits of the double slits 16; and K', a proportional constant.

Only $I_B(X)$ of FIG. 16(D) can be obtained by removing $F\{I_A(X)\}$ in FIG. 17(A) using a high-pass filter, and inverse-Fourier-transforming the filtered result.

Obtaining the pitch $T_1$ and the distance $T_2$ from the center to the peak in the waveform of $I_B(x)$ of FIG. 16(D), the phase difference $\theta$ can be calculated as follows:

$$\theta = 360° \cdot T_2/T_1.$$

The phase difference $\theta$ can directly be calculated from the ratio between the real part and the imaginary part of Fourier-transformed data $F\{I_B(x)\}$.

As shown in FIG. 18(C), even when the light under measurement has multiple wavelengths (see FIG. 18(A)), respective component profiles can be separated by Fourier-transforming the profile of an interference fringe which is formed by superposition of a plurality of (e.g., two) fringes wavelengths $\lambda_1$ and $\lambda_2$ (see FIG. 18(B)).

The Fourier-transform-based technique of the seventh embodiment can also be applied to the second embodiment using the streak camera 28 to perform time-resolving measurements.

In this case, if the light under measurement has multiple wavelengths, an image as shown in FIG. 19(B) is formed by Fourier-transforming a time-resolved interference fringe of FIG. 19(A) only in the x-axis.

A time waveform of the light under measurement can be obtained from the interference fringe of FIG. 19(A). The image of FIG. 19(B) provides a temporal variation of wavelength, i.e., a chirp, and a variation of the phase difference between light beams which have passed through the double slits 16.

Figure 20:
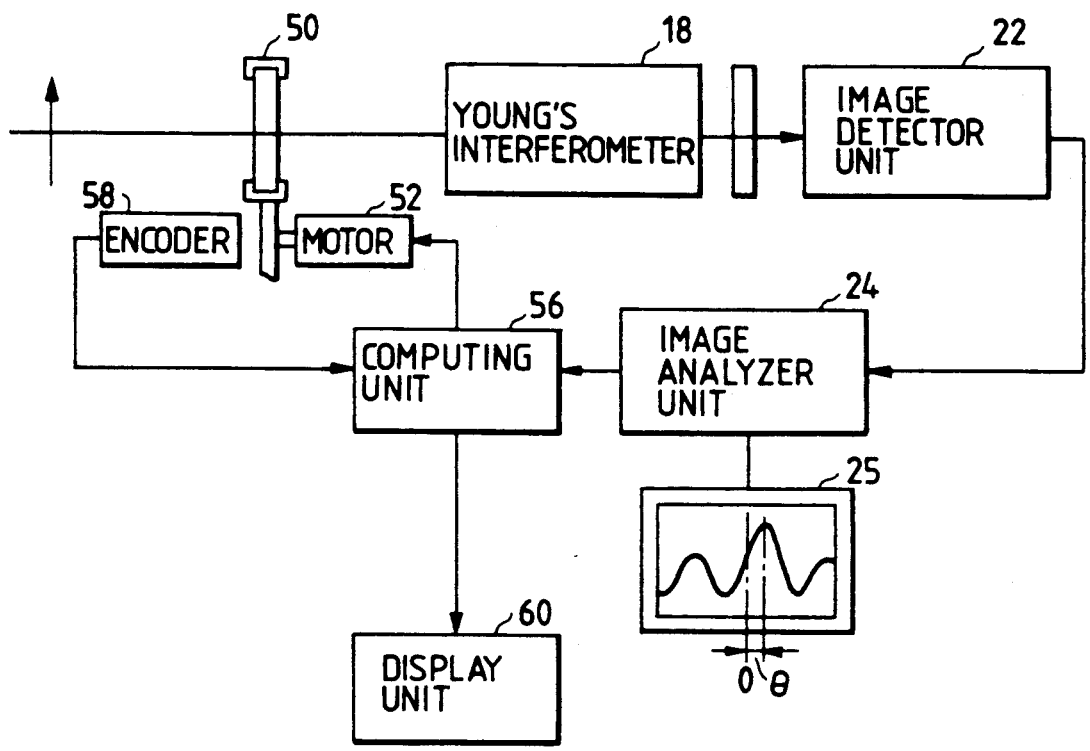
FIG. 20 is a block diagram showing a phase plate measuring apparatus according to an eighth embodiment of the invention.

An eighth embodiment of the invention will be described with reference to FIG. 20.

The eighth embodiment relates to an apparatus for measuring orientation of the crystal axis and the phase difference of a phase plate.

Major differences of the eighth embodiment from the first embodiment of FIG. 1 are as follows. Incident light is linearly polarized light. A phase plate 50 to be measured is disposed on the incidence side of Young's interferometer 18, in which two polarizers having orthogonal polarizing directions are provided in respective slits of double slits, in such a manner as to be rotatable about the axis of the incident light by means of a motor 52. An encoder 58 for measuring a rotation angle of the phase plate 50 is also used.

An image signal obtained by the image detector unit 22 is analyzed by an image analyzer unit 24. A profile output unit 25 displays an obtained profile as an intermediate output of the image analyzer unit 24. A computing unit 56 determines the orientation of the crystal axis and the phase difference of the phase plate 50 based on the analysis results of an interference fringe, and have a display unit 60 display those results. The remaining arrangement of the eighth embodiment is substantially the same as that of the FIG. 1 embodiment.

The linearly polarized light is passed through the phase plate 50, which is rotated by the motor 52, and then detected by the image detector unit 22. The peak of a profile of an interference fringe oscillates with the line "O" (screen center) in FIG. 20 as a central axis in accordance with the phase difference of the phase plate 50.

For example, if the phase plate 50 is a quarter-wave plate, and if the angle between the polarization direction of the incident light and the crystal axis of the phase plate 50 is 45°, a displacement of the peak of the profile with respect to the central axis O takes a maximum when the phase difference $\theta=90°$. If the angle is $-45°$, the displacement takes a maximum in the opposite direction when $\theta=-90°$. At angles between 45° and $-45°$, the envelope of the profile is not symmetrical, and hence the angle for providing the maximum displacement can easily be determined.

Thus, the phase difference of the phase plate 50 can be determined on the basis of the maximum angle of $\theta$.

Further, a position at which the peak of the profile is located at the central axis O represents the crystal axis or the axis perpendicular thereto, i.e., the phase retardation axis or advancement axis of the crystal constituting the phase plate 50.

The phase difference and the axis can be obtained in the following manner. The motor is rotated via the computing unit 56 so that a maximum peak displacement of the profile, which is obtained by the image analyzer unit 24, is obtained. The output data of the encoder at that time indicates the phase difference and the axis.

Although the eighth embodiment was explained for linearly polarized incident light, the present invention is not limited to such a case, but may be applied to incident light having any type of polarization if it is known.

What is claimed is:

1. A polarized light measuring apparatus comprising:
    a Young's interferometer including a single slit member and a double slit member parallel to said single slit member, said double slit member having two parallel slits containing polarizer elements having polarizing directions perpendicular to each other;
    an analyzer provided downstream of said Young's interferometer, said analyzer including first and second analyzer elements having first and second polarizing directions which coincide with said polarizing directions of said polarizer elements, respectively, and a third analyzer element having a third polarizing direction which is at +45° and −45° to said polarizing directions of said polarizer elements, respectively;
    image detecting means for detecting an interference fringe of incident light which has passed through said Young's interferometer and said analyzer; and
    image analyzing means for producing an intensity profile from an output signal of said image detecting means, and for analyzing said intensity profile to determine a polarization state of said incident light by comparing said produced intensity profile with a plurality of predetermined intensity profiles stored in said image analyzing means.

2. The apparatus according to claim 1, further comprising output means for displaying said polarization state.

3. The apparatus according to claim 1, wherein said analyzer is arranged such that its polarizing direction is at +45° and −45° to said polarizing directions of said polarizer elements, respectively.

4. The apparatus according to claim 1, further comprising means for rotating said analyzer about an axis of said incident light so that an envelope of said intensity profile becomes symmetrical.

5. The apparatus according to claim 1, wherein said image analyzing means determines said polarization state based on a ratio between intensities of and a phase difference between light beams extracted by said polarizer elements, which ratio is calculated based on output signals of said image detecting means in response to light beams passing through said first and second analyzer elements, and which phase difference is calculated based on an output signal of said image detecting means in response to a light beam passing through said third analyzer element.

6. The apparatus according to claim 1, wherein said first to third analyzer elements are arranged in a longitudinal direction of said two parallel slits of said double slit member.

7. The apparatus according to claim 1, wherein said first to third analyzer elements are arranged in a direction perpendicular to a longitudinal direction of said two parallel slits of said double slit member.

8. The apparatus according to claim 7, wherein said image detecting means includes a one-dimensional image sensor arranged in said arrangement direction of said first to third analyzer elements.

9. The apparatus according to claim 1, wherein said image detecting means includes a one-dimensional image sensor.

10. The apparatus according to claim 1, wherein said image detecting means includes a streak camera having an incidence-side slit extending perpendicularly to said two parallel slits of said double slit member.

11. The apparatus according to claim 1, further comprising means for varying an interval between said two parallel slits of said double slit member.

12. A phase plate measuring apparatus comprising:
    light source means for emitting incident light having known polarization;
    a Young's interferometer including a single slit member and a double slit member parallel to said single slit member, said double slit member having two parallel slits containing polarizer elements having polarizing directions perpendicular to each other;
    a phase plate disposed between said light source means and said Young's interferometer;
    means for rotating said phase plate about an axis of said incident light;
    means for detecting a rotation angle of said phase plate;
    image detecting means for detecting an interference fringe of said incident light which has passed through said phase plate, said Young's interferometer and said analyzer; and
    image analyzing means for producing an intensity profile from an output signal of said image detecting means, and for determining a phase difference and an axis of said phase plate on the basis of said detected rotation angle and a corresponding shift of a peak of said intensity profile.

13. A polarized light measuring apparatus comprising:
    a Young's interferometer including a single slit member and a double slit member parallel to said single slit member, said double slit member having two parallel slits containing polarizer elements having polarizing directions perpendicular to each other, said double slit member including a pair of wide slits having such large widths as to inhibit refraction of said incident light, and a plurality of pairs of slits having different slit intervals, said pair of wide slits and said plurality of pairs of slits being arranged in their longitudinal direction;

an analyzer provided downstream of said Young's interferometer;

image detecting means, including a two-dimensional image sensor, for detecting an interference fringe of incident light which has passed through said Young's interferometer and said analyzer; and image analyzing means for producing an intensity profile from an output signal of said image detecting means, and for analyzing said intensity profile to determine a polarization state of said incident light by comparing said produced intensity profile with a plurality of predetermined intensity profiles stored in said image analyzing means.

14. A polarized light measuring apparatus comprising:

a Young's interferometer including a single slit member and a double slit member parallel to said single slit member and a double slit member having two parallel slits containing polarizer elements having polarizing directions perpendicular to each other;

an analyzer provided downstream of said Young's interferometer;

image detecting means for detecting an interference fringe of incident light which has passed through said Young's interferometer and said analyzer; and image analyzing means for producing an intensity profile from an output signal of said image detecting means, and for analyzing said intensity profile to determine a polarization state of said incident light based on a ratio between intensities of and a phase difference between light beams extracted by said polarizer elements, and wherein said image analyzing means Fourier-transforms said intensity profile and separates the Fourier-transformed profile into a low frequency component containing information on said ratio and a high frequency component containing information on said phase difference.

* * * * *

UNITED STATES PATENT AND TRADEMARK OFFICE
CERTIFICATE OF CORRECTION

PATENT NO. : 5,237,388
DATED : August 17, 1993
INVENTOR(S) : Isuke Hirano et al.

It is certified that error appears in the above-indentified patent and that said Letters Patent is hereby corrected as shown below:

Claim 14, column 16, line 3, change "and a" to --, said--.

Signed and Sealed this

Twenty-first Day of June, 1994

Attest:

BRUCE LEHMAN

Attesting Officer          Commissioner of Patents and Trademarks